United States Patent
Caiozzo et al.

(10) Patent No.: US 8,629,231 B2
(45) Date of Patent: Jan. 14, 2014

(54) METHODS OF MAKING OLIGOMERS, COATING COMPOSITIONS CONTAINING THEM, AND COATED ARTICLES

(75) Inventors: Nicholas Caiozzo, St. Clair Shores, MI (US); Walter H Ohrbom, Hartland Township, MI (US); David C Cranfill, Whitmore Lake, MI (US)

(73) Assignee: BASF Coatings GmbH, Muenster (DE)

( * ) Notice: Subject to any disclaimer, the term of this patent is extended or adjusted under 35 U.S.C. 154(b) by 725 days.

(21) Appl. No.: 12/469,261

(22) Filed: May 20, 2009

(65) Prior Publication Data

US 2010/0298490 A1 Nov. 25, 2010

(51) Int. Cl.
*C08G 18/30* (2006.01)
*C08G 18/38* (2006.01)
*C08G 18/79* (2006.01)
*C07C 269/02* (2006.01)

(52) U.S. Cl.
USPC .......... 528/73; 528/44; 528/45; 528/49; 528/85; 549/228; 549/229; 560/25; 560/26; 560/115; 560/158

(58) Field of Classification Search
USPC ........ 528/44, 45, 49, 73, 85; 560/25, 26, 115, 560/158; 549/228, 229
See application file for complete search history.

(56) References Cited

U.S. PATENT DOCUMENTS

| | | | |
|---|---|---|---|
| 5,760,127 A | 6/1998 | Bammel et al. | |
| 6,166,148 A | 12/2000 | Ohrbom et al. | |
| 6,180,240 B1 | 1/2001 | St. Aubin et al. | |
| 6,914,115 B2 | 7/2005 | Spyrou et al. | |
| 7,300,997 B2 | 11/2007 | Wenning et al. | |
| 7,307,135 B2 | 12/2007 | Spyrou | |
| 8,293,836 B2 * | 10/2012 | Cranfill et al. | 524/589 |
| 2003/0050424 A1 | 3/2003 | Bernard | |
| 2003/0125501 A1 | 7/2003 | Ohrbom et al. | |
| 2004/0073046 A1 * | 4/2004 | Bernard | 549/228 |
| 2004/0219367 A1 | 11/2004 | Spyrou et al. | |
| 2005/0003206 A1 | 1/2005 | Spyrou et al. | |
| 2005/0096450 A1 | 5/2005 | Spyrou et al. | |
| 2005/0119437 A1 | 6/2005 | Wenning et al. | |
| 2005/0239956 A1 | 10/2005 | Spyrou et al. | |
| 2005/0239992 A1 | 10/2005 | Spyrou et al. | |
| 2007/0032594 A1 | 2/2007 | Mazanek et al. | |
| 2007/0266897 A1 | 11/2007 | Spyrou et al. | |
| 2008/0097025 A1 | 4/2008 | Spyrou et al. | |
| 2008/0139753 A1 | 6/2008 | Spyrou et al. | |
| 2008/0269415 A1 | 10/2008 | Spyrou et al. | |
| 2010/0137507 A1 | 6/2010 | Bernard et al. | |

FOREIGN PATENT DOCUMENTS

FR 2914309 10/2008

OTHER PUBLICATIONS

M. Edelmann et al., Thermokinetic analysis of two-step curing reactions in melt Part I. Investigation of low molecular model systems, Thermochimica Acta 452 (2007) 59-64.
M. Edelmann et al., Influence of various catalysts on the 1,3-diacetidine-2,4-dione (uretdione) reaction with hydroxyl groups. Progress in Organic Coatings 57 (2006) 251-258.
E. Querat et al., Blocked Isocyanate: Reaction and thermal behaviour of the toluene 2,4-diisocyanate dimer, Die Angewandte Makromolekulare Chemie 242 (1996) 1-36 (Nr. 4121).
Emmanouil Spyrou et al., "Highly Reactive, Blocking Agent-13 Free Polyurethane Powder Coatings" PCI article dated Nov. 1, 2005.

* cited by examiner

*Primary Examiner* — Rabon Sergent
(74) *Attorney, Agent, or Firm* — Quinn Law Group, PLLC

(57) ABSTRACT

An oligomer is made by capping a uretdione compound of structure

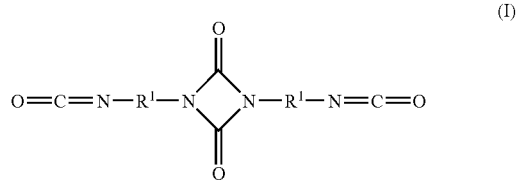

(I)

with a compound (II) having an active hydrogen and a carbamate or cyclic carbonate group under conditions in which the isocyanate groups but not the uretdione group react. The product (III) is either reacted with a reactant having at least two active hydrogens under reaction conditions that cleave the uretdione ring, after which any cyclic carbonate groups may be converted to carbamate groups, or a product (III) having cyclic carbonate groups is reacted with ammonia or primary amine to provide uretdione with a hydroxy carbamate group that is then self-condensed under uretdione ring-opening conditions. A curable coating composition comprises the oligomer; a coated article is prepared by applying a layer of the curable coating composition and curing the applied layer.

13 Claims, No Drawings

METHODS OF MAKING OLIGOMERS, COATING COMPOSITIONS CONTAINING THEM, AND COATED ARTICLES

FIELD OF INVENTION

The invention or inventions described in this disclosure relate to oligomers, methods for making oligomers, coating compositions containing such oligomers, and cured coatings derived from such coating compositions.

BACKGROUND INFORMATION

This section provides background information related to the present disclosure that may or may not include prior art.

Oligomers are useful components in curable compositions such as coating compositions. Oligomers can be used in coating systems, for example, as diluents or curing agents that undergo reaction under cure conditions to form a cured, crosslinked film. One problem with making oligomers has been producing oligomers of consistent identity, molecular weight, or both due to the variety of oligomers that can be formed when using polyfunctional reactants. Primarily simplistic systems of linear oligomers formed from difunctional reactants have been attempted. Work using trifunctional or even higher functionality reactants has produced gelled materials with other polyfunctional materials. It is difficult to make an oligomer composition with a consistent make-up from batch to batch due to the inherent difficulty is controlling the multiple reactions that can occur simultaneously when using multi-functional reactants. Protecting groups can be one way to address issues such as this but their removal generally requires an additional reaction step and in many instances an additional purification step. In addition, a lack of selectivity among the various functional groups toward the capping compound results unavoidably in a mixture of products, including those in which all functional groups are blocked and those in which an insufficient number of functional groups are blocked, resulting consequently in a distribution of species in the final product.

Accordingly, there remains a need in the art for methods of reliably and consistently forming oligomers of more consistent identity. In addition, oligomers may be useful in coating compositions if oligomer identity and molecular weight are such that properties of the coating composition like volatile organic content, cure temperature, and physical cured film properties are improved by incorporating the oligomer.

SUMMARY

The above drawbacks and disadvantages are addressed, at least in part, by a method comprising:

reacting one mole of a uretdione compound of structure (I)

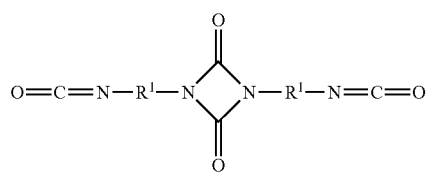

(I)

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups may be linear, branched, or cyclic;

with two moles of compounds (II) selected from compounds having one group having an active hydrogen reactive with isocyanate and a primary carbamate group (for example, a compound of structure (IIa)) or cyclic carbonate group (for example, a compound of structure (IIb)):

(IIa)

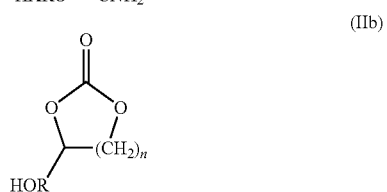

(IIb)

wherein X is O or $NR^2$, wherein $R^2$ is H or alkyl having 1 to 6 carbon atoms; n is 1 to 4, in certain embodiments 1 or 2; and R is alkyl, aryl, alkylaryl, or arylalkyl having up to 12 carbon atoms and optionally including one or more heteroatoms, which heteroatoms in some particular embodiments may in a group selected from ether, ester, amide, tertiary amine, urea, and urethane groups, the reaction being carried out under conditions in which the isocyanate groups but not the uretdione group of compound (I) react to form a compound (III) comprising at least one of structures (IIIa), (IIIb), and (IIIc):

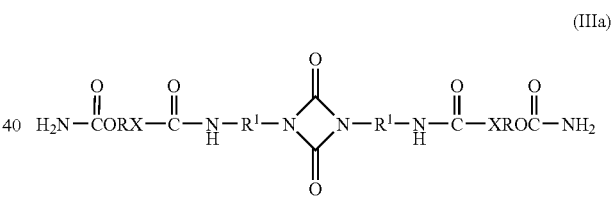

(IIIa)

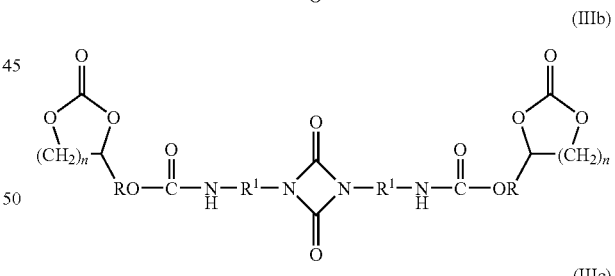

(IIIb)

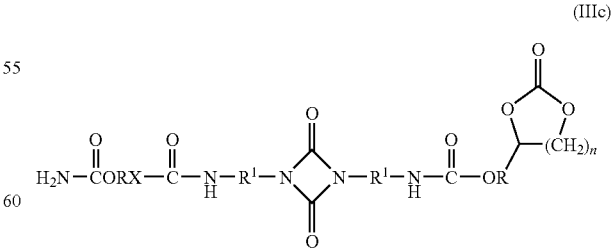

(IIIc)

wherein X, R, $R^1$, and n are as previously defined.

In certain embodiments, a compound (III) comprising a structure (IIIb) or (IIIc) is further reacted with ammonia under reaction conditions that preserve the uretdione structure to produce a compound comprising a structure (IIId) as the reaction product with a compound of the structure (IIIb):

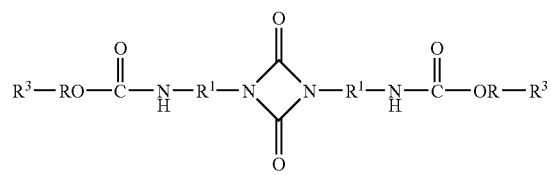

(IIId)

wherein X, R, and $R^1$ are as previously defined and each $R^3$ independently has a structure

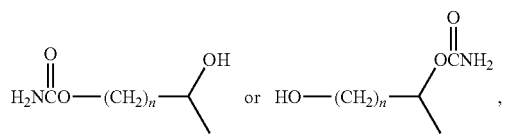

or to produce a compound comprising a structure (IIIe) as the reaction product with a compound of the structure (IIIc):

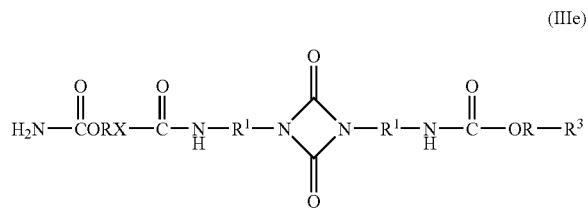

(IIIe)

wherein X, R, $R^1$, and $R^3$ are as previously defined.

A curable oligomer is then produced by a method in which compound (III) (as one or more of its structures (IIIa) to (IIIc)) may be further reacted with a reactant having at least two active hydrogen-containing groups selected from polyols, polyamines having at least two amine groups selected from primary and secondary amine groups, and aminoalcohols having at least one amine group that is a primary or secondary amine group to form a product that is an oligomer. The reactant having at least two active hydrogens may be represented by a formula $P(XH)_m$, in which X is as previously defined, m is an integer that is 1 or greater when X is NH or 2 or greater when X is not NH, and P represents an m-valent core of the reactant. In certain embodiments, m is an integer from 2 to about 40; m may also be an integer from 2 to about 20, or from 2 to about 10. While the reactant $P(XH)_m$ may be a simple polyfunctional compound, in certain embodiments, the reactant $P(XH)_m$ is itself an oligomer or polymer; in such embodiments, the alcohol and/or amine groups may be in terminal positions, located along the oligomer or polymer backbone, or both. When a compound (III) having a structure (IIIa) is reacted with the reactant $P(XH)_m$, the product comprises a material having a structure (IVa):

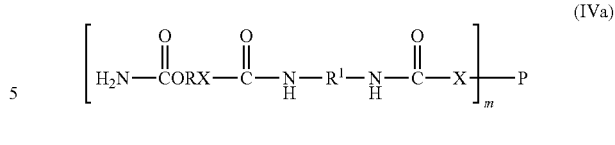

(IVa)

wherein R, X, $R^1$, P, and m are as previously defined. When a compound (III) having a structure (IIIb) is reacted with the reactant $P(XH)_m$, the product comprises a material having a structure (IVb):

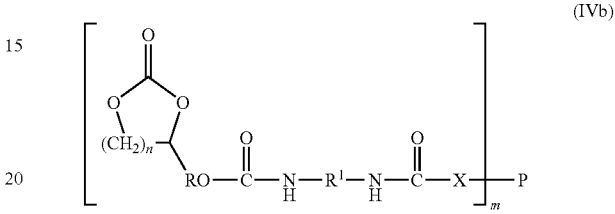

(IVb)

wherein R, X, $R^1$, P, n, and m are as previously defined. When a compound (III) having a structure (IIIc) is reacted with the reactant $P(XH)_m$, the product is a mixture of a material having a structure (IVa) and a material having a structure (IVb).

A compound (III) having a structure (IIId) may be self-polymerized by opening the uretdione ring with catalyst, heat, or both, the resulting monoisocyanate, monohydroxy compound being self-condensed to form an oligomer comprising repeating monomer units of structures (IVc):

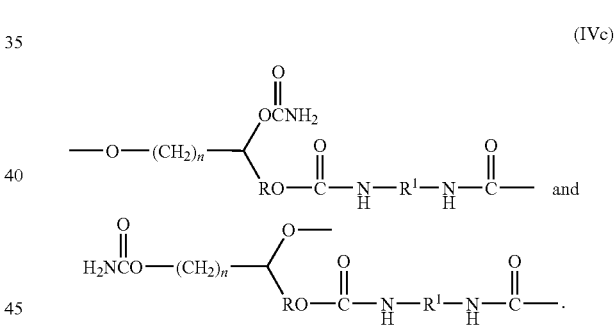

(IVc)

A small amount of a monohydroxyl compound or other compound with a single isocyanate-reactive group may be introduced to terminate the polymerization at a desired weight average molecular weight for the product.

A compound (III) having a structure (IIIe) could be reacted with a mixture of polyfunctional and monofunctional active hydrogen-containing compounds under conditions that open up the uretdione ring to provide a mixture of self-polymerized and interpolymer products as one side of the uretdione compound produces the precursor to the monomer units of structure (IVc) while the other side produces a monofunctional isocyanate compound.

Also disclosed is a curable coating composition including (a) at least one oligomer (IV) and (b) at least one aminoplast resin crosslinker. The coating composition may be applied to a substrate, such as an automotive body or part, and cured.

Also disclosed is a cured coating derived from the coating composition.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all values and further divided ranges within the entire range.

DETAILED DESCRIPTION AND EXAMPLE EMBODIMENTS

Further areas of applicability and advantages will become apparent from the following description. It should be understood that the description and specific examples, while exemplifying various embodiments of the invention, are intended for purposes of illustration and are not intended to limit the scope of the invention.

As discussed above it can be difficult to make an oligomer composition with a consistent make-up from batch to batch due to the inherent difficulty in controlling the multiple reactions that can occur simultaneously when using multi-functional reactants, particularly when there is no difference in reactivity among the reactive groups of a reactant. Protecting groups can be one way to address issues such as this but their removal generally requires an additional reaction step and in many instances an additional purification step. Disclosed herein is a method for forming an oligomer which employs the equivalent of a self protected diisocyanate (the uretdione compound of structure (I)) as a reactant in forming an oligomer. As the uretdione group does not undergo reaction with compound (II), the uretdione group may later be cleaved to provide two monoisocyanate compounds for reaction with reactant $P(XH)_m$.

In the first step of the method for making oligomer (IV), compound (I), with structure (I),

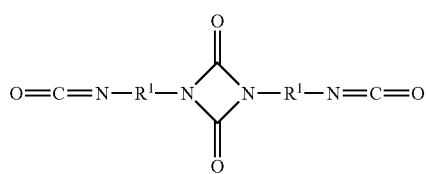

(I)

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups may be linear, branched, or cyclic is reacted with compound (II) having both an active hydrogen group and a carbamate or cyclic carbonate group, which compound (II) may have structure (IIa), structure (IIb), or a combination of both structures

(IIa)

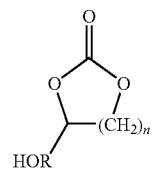

(IIb)

wherein X is O or $NR^2$, wherein $R^2$ is H or alkyl having 1 to 6 carbon atoms, and in certain embodiments X is O; n is 1 to 4, in certain embodiments 1 or 2; and R is alkyl, aryl, alkylaryl, or arylalkyl having up to 12 carbon atoms and optionally including one or more heteroatoms, which heteroatoms in some particular embodiments may in a group selected from ether, ester, amide, tertiary amine, urea, and urethane groups. In some embodiments, each $R^1$ is independently a divalent hydrocarbylene of 4 or 6 carbons, an isophoronylene divalent radical

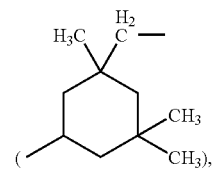

a cyclohexylene divalent radical, or a tolylene divalent radical; and in some embodiments R is methylene or a divalent polylactone radical

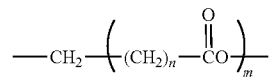

in which n is an integer from 3 to 6 and m is an integer from 1 to about 10, and in some embodiment m is an integer from 1 to about 4. Compounds of structures (I) and (II) are commercially available. Uretdiones of structure (I) may be made, for example, by dimerization of diisocyanates according to well-known methods, for example as described in U.S. Patent Application Publication No. US 2007/0032594, incorporated herein by reference. Some trimerization of the diisocyanate (to form an isocyanurate) may also occur. Commercial sources of uretdiones may contain 5 to 30% by weight of the corresponding isocyanurate of the diisocyanate. While not necessarily preferred, presence of the trimer compound does not generally cause problems in the first reaction step or in later reaction steps, but when a mixture of the uretdione and isocyanurate of a diisocyanate is used, the oligomer product will be expected to also contain the reaction product of the isocyanurate and compound (II). In one example, the compound (I) comprises the uretdione of hexamethylene diisocyanate, which is commercially available as DESMODUR® N3400 from Bayer Corporation, Pittsburgh Pa., which is a mixture of the uretdione and isocyanurate of hexamethylene diisocyanate, or DESMODUR® XP-2730.

Nonlimiting, illustrative examples of compound (II) that may be used in the first reaction step include hydroxypropylcarbamate, hydroxybutylcarbamate, glycerin carbonate, 2-hydroxyethyl-N-methylcarbamate, hydroxyalkyl-1,3-dioxane-2-one, 1,3-propanediol monocarbamate, the corresponding polycaprolactone extensions of these alcohols (which may be prepared as described in Bammel et al., U.S. Pat. No. 5,760,127, incorporated herein by reference), and combinations of these.

In the reaction of the first step of the method, uretdione compound (I) is capped with compound (II) by reacting about two moles or more of compound (II) per mole of compound (I) so that both terminal isocyanate groups of compound (I) are reacted. The reaction of the first step may be carried out under typical conditions for reaction of isocyanate groups with the —XH group of structure (IIa) or —OH group of structure (IIb), with the proviso that the uretdione group does not react under the selected reaction conditions. In certain embodiments, the reaction of the first step is carried out at a temperature of from about 20° C. to about 100° C. optionally in the presence of a catalyst. In other embodiments, the reaction may be carried out at a temperature of from about 20° C. to about 80° C. or at a temperature of from about 50° C. to about 80° C. again optionally in the presence of a catalyst. While a temperature above 100° C. is generally not preferred, such a temperature may be used if, under the reaction conditions, the uretdione group of the selected compound (I) does not ring open to any appreciable extent (and preferably does not ring open at all).

Nonlimiting, illustrative examples of suitable catalysts that may be used during the reaction of the first step include tertiary amines such as triethylamine, DABCO, and organotin and organobismuth compounds such as dibutyltin dilaurate, dibutyltin oxide, bismuth octoate, and combinations of these. The amount of catalyst, if used, is generally from about 0.01 to about 5 wt. % based on the total weight of compounds (I) and (II). The catalyst in certain embodiments may be from about 0.05 to about 2 wt. % based on the total weight of compounds (I) and (II), or may be from about 0.1 to about 1 wt. % based on the total weight of compounds (I) and (II).

The reaction of the first step may be carried out neat or in the presence of one or more non-protic (and thus unreactive) solvents. Nonlimiting examples of suitable solvents include aliphatic and aromatic hydrocarbons such as toluene, xylene, and Aromatic 100 (e.g., available from ExxonMobil as SOLVESSO 100); ketones such as methyl ethyl ketone, methyl isobutyl ketone, and methyl propyl ketone; esters such as propyl acetate, butyl acetate, amyl acetate, ethyl propionate, and propyl propionate; and glycol diethers and ether esters such as ethylene glycol diethyl ether, ethylene glycol monobutyl ether acetate, propylene glycol monopropyl ether acetate; and so on. Suitable solvents may be used in combination.

The reaction can be followed by disappearance of free isocyanate groups, which may be determined for example by titration (e.g. reaction with excess secondary amine and titration of the residual amine with acid) or by infrared spectrophotometry. The reaction may be carried out at atmospheric pressure, but higher pressures may also be used. The reaction product of the first step, compound (III), may be isolated before being used in the second reaction step or may be used without isolation or purification in the second reaction step. The reaction time until completion will vary depending upon the factors the person skilled in carrying out reaction like this should expect, such as presence of absence of catalyst, type of catalyst, reaction temperature, particular reactants selected, and concentration of reactants in the reaction medium.

The product compound (III) comprises at least one of structures (IIIa), (IIIb), and (IIIc):

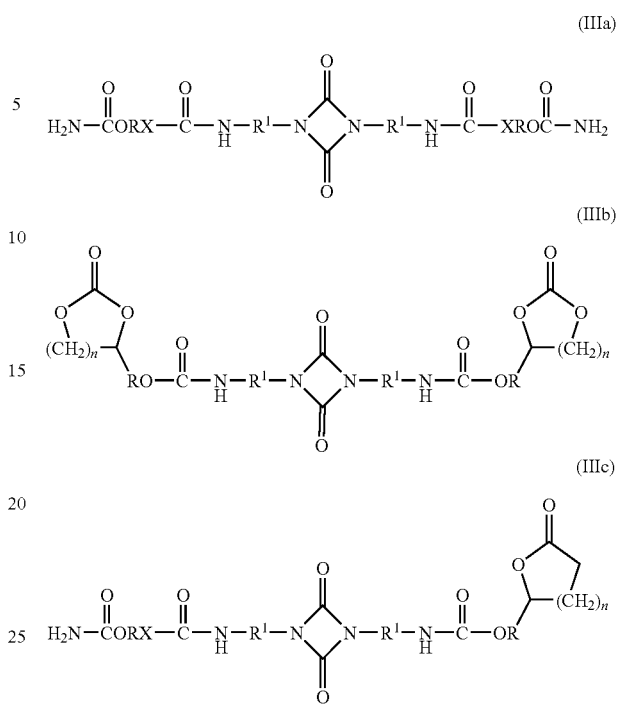

wherein X, R, R$^1$, and n are as previously defined.

When a compound (II) having a cyclic carbonate group is used as a reactant in the first reaction step, the product compound (III) will have a cyclic carbonate group, as shown in structures (IIIb) and (IIIc). Structure (IIIc) results when the compounds (II) reacted in the first step include both at least one with a cyclic carbonate group and at least one with a carbamate group. In certain embodiments, a compound (III) comprising a structure (IIIb) or (IIIc) is further reacted with ammonia (which may be in its aqueous form of ammonium hydroxide) under mild conditions that preserve the uretdione ring unreacted to produce a compound of structure (IIId) as the reaction product of a compound of the structure (IIIb):

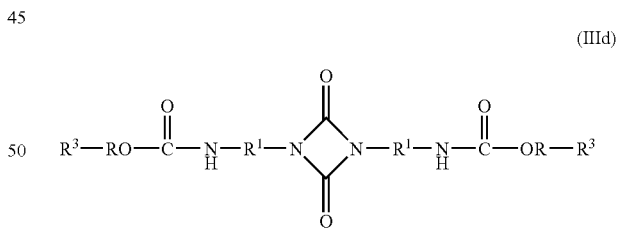

wherein X, R, and R$^1$ are as previously defined and each R$^3$ independently has a structure

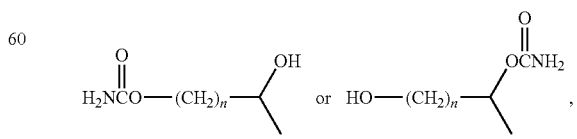

or to produce a compound comprising a structure (IIIe) as the reaction product of a compound of the structure (IIIc):

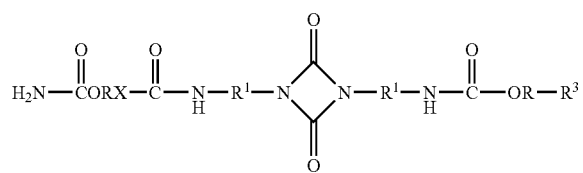

(IIIe)

wherein X, R, R¹, and R³ are as previously defined. The reaction of the cyclic carbonate ring with ammonia may be carried out under mild conditions at temperatures at which the uretdione ring is preserved; for example at room temperature or lower, particularly at 10° C. or lower, and more particularly at 0° C. or lower. It can be carried out in organic solvents such as methanol, or the reaction can be carried in water, or a mixture of water and organic solvents. When water is used as the sole solvent or as a part of a solvent blend, ammonium hydroxide may be used in place of ammonia. Alternatively, liquefied ammonia may be used as the solvent.

The compound (III) is reacted with a reactant having at least two active hydrogens. The reactant having at least two active hydrogens may be represented by a formula $P(XH)_m$, in which X is as previously defined, m is an integer that is 1 or greater when X is NH or 2 or greater when X is not NH, and P represents an m-valent core of the reactant. In certain embodiments, m is an integer from 2 to about 40; m may also be an integer from 2 to about 20, or from 2 to about 10. While the reactant $P(XH)_m$ may be a simple polyfunctional compound, in certain embodiments, the reactant $P(XH)_m$ is itself an oligomer or polymer; in such embodiments, the alcohol and/or amine groups may be in terminal positions, located along the oligomer backbone, or both. with a plurality of active hydrogens to form an oligomer (V) under reaction conditions that cause the four-membered uretdione ring to cleave and react with the active hydrogens.

As should be readily recognized, if the two fragments of compound (III) formed by cleaving the uretdione ring are different or if a plurality of compounds (III) of different structures are reacted, more than one oligomer (V) can be formed. In some embodiments, a symmetrical compound (III), which generates identical fragments when the uretdione ring cleaves, is used so that oligomer (V) molecules will all be of the same structure.

Nonlimiting, illustrative examples of active hydrogen groups of the reactant having at least two active hydrogens are hydroxyl groups, primary amine groups, secondary amine groups, and thiol groups. The reactant having at least two active hydrogens in certain embodiments may have (and thus m may be) 2 to about 40 or 2 to about 20, or from 2 to about 10 groups containing active hydrogens, which may be selected from the examples of such groups just mentioned. For example, reactant $P(XH)_m$ can be selected from polyols (including diols, triols, and polyols of higher functionality $(P(OH)_m)$, polyamines (including diamines, triamines, and polyamines of higher functionality $(P(NR^2H)_m))$, aminoalcohols $(P(OH)_n(NR^2H)_{m-n}$, wherein n is an integer of at least one and less than m), and combinations of these. Particular, illustrative examples of suitable materials (IV) include 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, 2,2,4-trimethyl-1,3-pentanediol, cyclohexanediols, trimethylolpropane, trimethylolethane, trimethylolbutane, 3,5,5-trimethyl-2,2-dihydroxymethylhexane-1-ol, glycerol, 1,2,6-hexane triol glycerin, pentaerythritol, ditrimethylolpropane, diglycerol and ditrimethylolethane; ethylene diamine, diethylene triamine, triethylenetetraamine, propylene diamine, butylene diamine, cyclohexylenediamine, tris(2-aminoethyl)amine, hexamethylenediamine, 1,8-diaminoctane, the isomers of diaminocyclohexane 2,5-diamino-2,5-dimethylhexane, 1-amino-3,3,5-trimethyl-5-aminomethylcyclohexane, nonanetriamine, the isomers of 1-methylcyclohexanediamine, other alkyl-substituted cyclohexanediamines such as isopropyl-2,4- and/or -2,6-diaminocyclohexane, 1,3-cyclohexanebis(methylamine), 5-amino-2,2,4-trimethyl-1-cyclopentane-methylamine, 2,4'- and 4,4'-methylenebis(cyclohexylamine), 3,3'-dimethyl-4,4'-methylenebis(cyclohexylamine), the isomers of diaminodicyclohexylmethane containing a methyl group as main substituent (monomethyldiaminodicyclohexylmethane), 3(4)-aminomethyl-1-methylcyclohexylamine, and bridged cyclohexanediamines; and aminoalcohols such as ethanolamine, aminoethylethanolamine, 2-amino-1-propanol, 2-amino-2-methyl-1-propanol (AMP), 2-amino-2,2-dimethylethanol, 2-amino-2-ethyl, 1-3-propanediol (AEPD), tris(hydroxymethyl)-aminomethane, 1-amino-1-methyl-2-hydroxycycloexane, and 2-amino-2-methyl-1-butanol; and combinations of these.

Examples in which the active hydrogen functional reactant is an oligomer include, without limitation, any of the above-mentioned polyols that has been extended by condensation with a lactone, such as epsilon-caprolactone; low molecular weight, hydroxyl-functional polyesters, polyureas, or polyurethanes; and dimer fatty acid diols. Illustrative examples of specific compounds include trimethylolpropane extended with epsilon-caprolactone (which may be prepared with a reactant ratio of 1 mole of trimethylolpropane to from 3 to 12 moles of epsilon-caprolactone), the reaction product of the trimer of isophorone diisocyanate with 2-ethyl-1,3-hexanediol, and Polycin M-365 from Vertellus.

The reaction of compound (III) is reacted with the reactant having at least two active hydrogens may be carried out under conditions known to cleave a uretdione ring of compound (III) and under which the resulting isocyanate groups will react with the active hydrogens of the reactant having at least two active hydrogens. Suitable reaction temperatures may depend in part on the catalyst used, if a catalyst is used. Typical reaction temperatures when a catalyst for opening the uretdione ring is used are from about from about 20° C. to about 115° C. In other embodiments, the reaction may be carried out at a temperature of from about 20° C. to about 110° C. or at a temperature of from about 50° C. to about 110° C. or at a temperature of from about 80° C. to about 110° C. Nonlimiting, illustrative examples of suitable catalysts for opening the uretdione ring are quaternary ammonium hydroxides or fluorides as described in U.S. Pat. No. 6,914,115, column 2, lines 50-60 and column 5, line 47 to column 6, line 34, which are incorporated herein by reference; organometallic compounds as described in U.S. Patent Application Publication No. US 2004/0219367 in paragraphs [0016]-[0021], [0050]-[0053], and [0073]-[0075, which are incorporated herein by reference; tetraalkyl ammonium carboxylate compounds as described in U.S. Patent Application Publication No. US 2005/0003206 in paragraphs [0017]-[0019] and [0060]-[006], which are incorporated herein by reference; such catalysts as described in U.S. Patent Application Publication No. US 2005/0096450 in paragraphs [0023]-[0026], [0038]-[0041], and [0056]-[0070], which are incorporated herein by reference; metal acetylacetonates, metal hydroxides, and metal alkoxides such as zinc(II) acetylacetonate, calcium acetylacetonate, magnesium acetylacetonate, aluminum(III) acetylacetonate, zirconium(IV) acetylacetonate, aluminum(III) acetylacetonate, and the like; phosphorous-containing catalysts such as described in U.S. Patent Application Publication No. US 2007/0266897 in paragraphs [0015] and [0028]-[0031], which are incorporated herein by reference; organometallic catalysts such as described in U.S. Patent Application Publication No. US 2005/0239992 in paragraphs [0015]-[0018], [0060]-[0063], and [0080] and the catalysts mentioned in paragraph [0100], each of which paragraphs are incorporated herein by reference; catalysts such as described in U.S. Patent Application Publication No. US 2005/00239956 in paragraphs [0015]-[0033], [0039]-[0057], [0067]-[0084], [0101]-[0105], and [0128]-[0136], which are incorporated herein by reference; catalysts such as described in U.S. Patent Application Publication No. US 2008/0097025 in paragraphs [0025]-[0029] and [0043]-[0050], which are incorporated herein by reference; and catalysts such as described in U.S. Patent Application Publication No. US 2008/0139753 in paragraphs [0014]-[0018] and [0030]-[0042], which are incorporated herein by reference; these may be used in combination if desired. It is also possible to carry out the reaction of compound (III) with material (IV) in the absence of a catalyst for opening up the uretdione ring at higher temperatures. In general, the reaction can be carried out at a temperature from about 100° C. to about 180° C. In certain embodiments, a temperature from about 120° C. to about 160° C. is used.

The reaction can occur in the presence or absence of solvent. The reaction can be carried out using the same reaction solvents, and in the presence of the catalyst, as used in the reaction between compounds (I) and (II). Exemplary solvents are organic solvents that are inert to the reaction and include xylene, toluene, aromatic S-100, methyl amyl ketone, butyl acetate, amyl acetate, and the like. If desired, the reaction can be performed at above atmospheric pressure. The extent of reaction may be followed by disappearance of a peak associated with the uretdione group using infrared spectroscopy.

The reaction of compound (III) with the reactant having at least two active hydrogens produces an oligomer (IV). When a compound (III) having a structure (IIIa) is reacted with the reactant $P(XH)_m$, the product comprises a material having a structure (IVa):

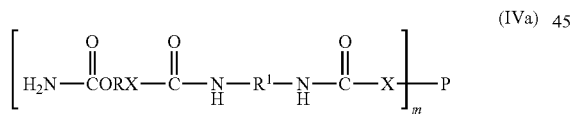
(IVa)

wherein R, X, $R^1$, P, and m are as previously defined. When a compound (III) having a structure (IIIb) is reacted with the reactant $P(XH)_m$, the product comprises a material having a structure (IVb):

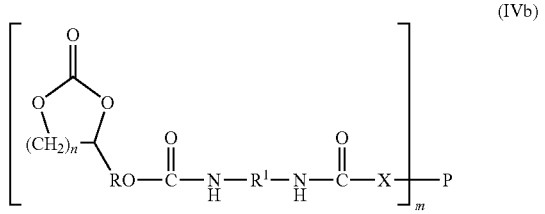
(IVb)

wherein R, X, $R^1$, P, n, and m are as previously defined. When a compound (III) having a structure (IIIc) is reacted with the reactant $P(XH)_m$, the product is a mixture of a material having a structure (IVa) and a material having a structure (IVb).

A compound (III) having a structure (IIId) may be self-polymerized by opening the uretdione ring with catalyst, heat, or both, the resulting monoisocyanate, monohydroxy compound being self-condensed to form an oligomer comprising repeating monomer units of structures (IVc):

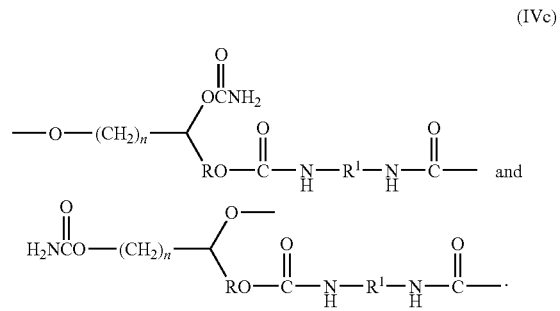
(IVc)

in which n is an integer from 1 to 4 and $R^1$ is as previously defined. A small amount of a monohydroxyl compound or other compound with a single isocyanate-reactive group may be introduced to terminate the polymerization at a desired weight average molecular weight for the product.

A compound (III) having a structure (IIIe) could be reacted with a mixture of polyfunctional and monofunctional active hydrogen-containing compounds under conditions that open up the uretdione ring to provide a mixture of self-polymerized and interpolymer products as one side of the uretdione compound produces the precursor to the monomer units of structure (IVc) while the other side produces a monofunctional isocyanate compound.

When compound (III) includes a structure (IIIb) or (IIIc), the oligomer (IV) will have one or more cyclic carbonate groups. As described above with regard to making compounds (III) having structures (IIId) and (IIIe), any cyclic carbonate rings may be reacted with ammonia (which may be in its aqueous form of ammonium hydroxide) to convert the cyclic carbonate rings to carbamate groups of structure

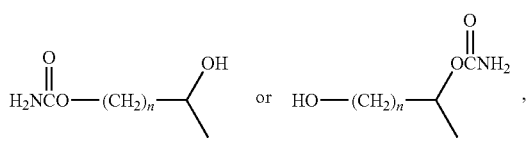

which it will be appreciated will generally be present in some combination.

Also disclosed is a curable coating composition including (a) at least one oligomer (IV) and (b) at least one aminoplast resin crosslinker. An aminoplast for purposes of the invention is a material obtained by reaction of an activated nitrogen with a lower molecular weight aldehyde, optionally further reacted with an alcohol (preferably a mono-alcohol with one to four carbon atoms) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate functional compounds having at least one primary carbamate group or at least two secondary carbamate groups. The aminoplast resins are in certain embodiments amine/formaldehyde condensates, although other aldehydes, such as acetaldehyde, crotonaldehyde, and benzaldehyde, may be used. Non-limiting examples of suitable aminoplast resins include monomeric or polymeric melamine formaldehyde resins, including melamine resins that are partially or fully alkylated using alcohols that typically have one to six, preferably one to four, carbon atoms, such as hexamethoxymethylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

Suitable coating compositions may be one, two or multi-component coating compositions and may be in the form of powder coating compositions, powder slurry coating compositions, waterborne coatings/aqueous dispersions, or solvent borne coating compositions.

In certain embodiments, the curable coating composition is a clearcoat coating composition. As used herein, the term "clearcoat" refers to a generally transparent coating layer which is positioned over a basecoat or color coat layer. Furthermore, the clearcoat is generally the outermost coating over the substrate. In addition to the oligomer (IV) and aminoplast resin crosslinker, the curable clearcoat coating composition may include a further polymer or oligomer that is also reactive with the aminoplast resin crosslinker. The further polymer or oligomer may have a number average molecular weight of from 600 to 10,000 and may have an equivalent weight, based on active hydrogen groups, of from 32 to 2000. Such active hydrogen group containing polymers and oligomers include, for example, acrylic polymers, modified acrylic polymers, polyesters including polylactones, polyurethanes, and polysiloxanes, star ester oligomers, polyurethane oligomers, and natural product oligomers such as dimer-fatty dicarbamate or diol compounds.

The coating composition used in the method of the invention may include a catalyst to enhance the cure reactions between the oligomer (IV) and the aminoplast resin crosslinker. Nonlimiting, suitable examples include para-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the curable compositions include Lewis acids, zinc salts, and tin salts.

A solvent or solvents may be included in the coating composition. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents. In general, protic solvents such as alcohol and glycol ethers are avoided when the coating composition includes the optional polyisocyanate crosslinker, although small amounts of protic solvents can be used even though it may be expected that some reaction with the isocyanate groups may take place during curing of the coating.

Additional agents, for example hindered amine light stabilizers, ultraviolet light absorbers, antioxidants, surfactants, stabilizers, wetting agents, rheology control agents, dispersing agents, adhesion promoters, etc. may be incorporated into the coating composition. Such additives are well-known and may be included in amounts typically used for coating compositions.

The coating compositions can be coated on a substrate by spray coating. Electrostatic spraying is a preferred method. The coating composition can be applied in one or more passes to provide a film thickness after cure of typically from about 20 to about 100 microns.

The coating composition can be applied onto many different types of substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

After application of the coating composition to the substrate, the coating is cured, preferably by exposing the coating layer to heat for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes.

In one embodiment, as mentioned, the coating composition is utilized as the clearcoat of an automotive composite color-plus-clear coating. The pigmented basecoat composition over which it is applied may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions are preferably subjected to conditions so as to cure the coating layers as described above.

The coating composition may also be utilized as a one-layer topcoat or as a basecoat coating. A one-layer topcoat or basecoat coating composition includes one or more of the pigments mentioned above, and provides the color and/or metallic effect. A curable basecoat coating including the oligomer (IV) may be used with a clearcoat coating composition such as those described in the art, including those containing film forming materials with hydroxyl, carboxyl, epoxide, and/or carbamate groups and crosslinkers including aminoplasts, polyisocyanates, polyepoxides, and polycarboxylic acids.

The substrate to which the curable coating composition is applied may be an automotive body or part. The applied coating composition is then cured to provide a coated automotive body or part.

The invention is further described in the following example. The example is merely illustrative and does not in any way limit the scope of the invention as described and claimed. All parts are parts by weight unless otherwise noted.

EXAMPLES

Example 1 of the Invention

Hydroxy propyl carbamate (HPC, 0.493 mole, 58.7 g), dibutyltin dilaurate (DBTL, Fastcat 4202, 0.00025 mole, 0.16 g), and methyl propyl ketone (MPK, 200 ml) were charged to a flask under nitrogen. While agitating, the mixture was heated to 60° C. A solution of homopolymer of hexamethylene diisocyanate (DESMODUR N 3400, 0.298 mole, 100 g) in MPK (50 ml) was added dropwise to the HPC solution over 1.5 hr. The temperature of the reaction was kept between 60-80° C., and the reaction was monitored by IR. The reaction was deemed complete after 5 hrs by the disappearance of the isocyanate peak by IR.

A portion of the hydroxylpropyl carbamate-capped DESMODUR N3400 solution (47.39% non-volatiles, 7.87 g), Polycin M-365 (multiple hydroxyl functional resin, 2.20 g), and zinc acetylacetonate hydrate (0.03 g) were charged to a flask under nitrogen and agitated. The mixture was heated to reflux (106° C.), the nitrogen flow was removed, and agitated for 4 hr. The material showed no signs of gel formation. IR shows only the trace appearance of the uretdione peak at 1764 cm$^{-1}$.

Example 2 of the Invention

Hydroxy propyl carbamate (HPC, 0.493 mole, 58.7 g), dibutyltin dilaurate (DBTL, Fastcat 4202, 0.00025 mole, 0.16 g), and methyl propyl ketone (MPK, 200 ml) were charged to a flask under nitrogen. While agitating, the mixture was heated to 60° C. A solution of homopolymer of hexamethylene diisocyanate (DESMODUR N 3400, 0.298 mole, 100 g) in MPK (50 ml) was added dropwise to the HPC solution over 1.5 hr. The temperature of the reaction was kept between 60-80° C., and the reaction was monitored by IR. The reaction was deemed complete after 5 hrs by the disappearance of the isocyanate peak by IR.

A portion of the hydroxyl propyl carbamate-capped DESMODUR N3400 solution (47.39% non-volatiles, 7.87 g) and Polycin M-365 (multiple hydroxyl functional resin, 2.20 g) were charged to a flask under nitrogen and agitated. The mixture was heated to reflux (109° C.), the nitrogen flow was removed, and agitated for 3.5 hr. The material showed no signs of gel formation. IR shows only the trace appearance of the uretdione peak at 1764 cm$^{-1}$.

Example 3 of the Invention

Hydroxy propyl carbamate (HPC, 0.493 mole, 58.7 g), dibutyltin dilaurate (DBTL, Fastcat 4202, 0.00025 mole, 0.16 g), and methyl propyl ketone (MPK, 200 ml) were charged to a flask under nitrogen. While agitating, the mixture was heated to 60° C. A solution of homopolymer of hexamethylene diisocyanate (DESMODUR N 3400, 0.298 mole, 100 g) in MPK (50 ml) was added dropwise to the HPC solution over 1.5 hr. The temperature of the reaction was kept between 60-80° C., and the reaction was monitored by IR. The reaction was deemed complete after 5 hrs by the disappearance of the isocyanate peak by IR.

A portion of the hydroxyl propyl carbamate-capped DESMODUR N3400 solution (43.34% non-volatiles, 13.41 g), ethylene glycol (0.91 g), and zinc acetylacetonate hydrate (0.14 g) were charged to a flask under nitrogen and agitated. The mixture was heated to reflux (104° C.), the nitrogen flow was removed, and agitated for 4 hr. The material showed no signs of gel formation. IR shows the disappearance of the uretdione peak at 1764 cm$^{-1}$.

Example 4 of the Invention

Coatings

Example 4A

Example 1 (61.94% nonvolatiles, 5.02 g) was combined with Resimene HM 2608 (melamine crosslinker, 0.58 g) and p-toluenesulfonic acid (0.07 g). The mixture was agitated until all materials dissolved. A drawdown of the material was performed utilizing the #4 gap on the draw down bar and applied onto a metal panel. The panel was then placed in an 110° C. oven for 1 hr. to provide a cured coating layer on the panel.

Example 4B

Example 1 (61.94% nonvolatiles, 4.99 g) was combined with Resimene HM 2608 (melamine crosslinker, 0.75 g) and p-toluenesulfonic acid (0.06 g). The mixture was agitated until all materials dissolved. A draw down of the material was performed utilizing the #4 gap on the draw down bar and applied onto a metal panel. The panel was then placed in an 110° C. oven for 1 hr. to provide a cured coating layer on the panel.

The invention has been described in detail with reference to preferred embodiments thereof. It should be understood, however, that variations and modifications can be made within the spirit and scope of the invention and of the following claims.

What is claimed is:
1. A method of making an oligomer, comprising:
(a) reacting one mole of a uretdione compound (I)

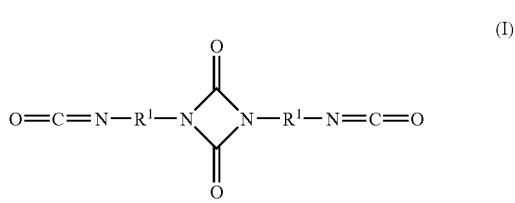

wherein each R$^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups are linear, branched, or cyclic;
with two moles of compound (II) selected from compounds having one group having an active hydrogen reactive with isocyanate and further having a primary carbamate group or a cyclic carbonate group to form a compound (III), and (b) reacting compound (III) with a reactant having at least two active hydrogen-containing groups selected from the group consisting of polyols, polyamines having at least two amine groups selected from primary and secondary amine groups, and aminoalcohols having at least one amine group that is a primary or secondary amine group under reaction conditions that cause the uretdione ring to cleave and react with the active hydrogens to form the oligomer.

2. A method according to claim 1, wherein the compound (II) has a structure (IIa) or a structure (IIb):

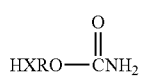
(IIa)

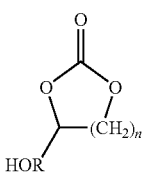
(IIb)

wherein X is O or $NR^2$, wherein $R^2$ is H or alkyl having 1 to 6 carbon atoms; n is 1 to 4; and R is alkyl, aryl, alkylaryl, or arylalkyl having up to 12 carbon atoms and optionally including one or more heteroatoms.

3. A method according to claim 2, wherein R includes one or more heteroatoms in a group selected from ether, ester, amide, tertiary amine, urea, and urethane groups.

4. A method according to claim 1, wherein compound (III) comprises a structure selected from the group consisting of structures (IIIa), (IIIb), and (IIIc):

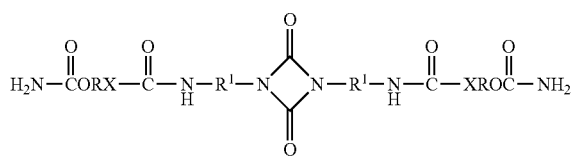
(IIIa)

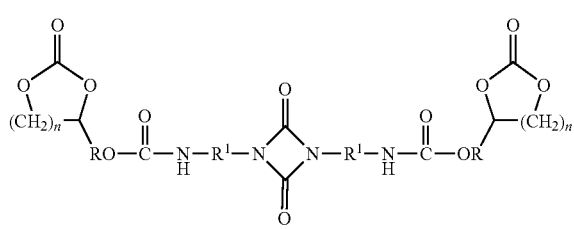
(IIIb)

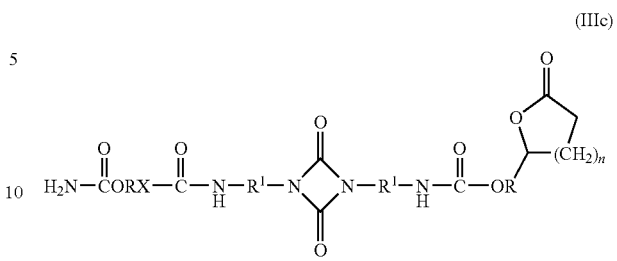
(IIIc)

wherein X is O or $NR^2$, wherein $R^2$ is H or alkyl having 1 to 6 carbon atoms; n is 1 to 4, and R is alkyl, aryl, alkylaryl, or arylalkyl having up to 12 carbon atoms and optionally including one or more heteroatoms.

5. A method according to claim 4, wherein R includes one or more heteroatoms that are in a group selected from ether, ester, amide, tertiary amine, urea, and urethane groups.

6. A method according to claim 1, wherein the oligomer comprises a cyclic carbonate group, further comprising a step of reacting the cyclic carbonate group with ammonia to provide a carbamate group.

7. A method according to claim 1, wherein the oligomer has a structure selected from the group consisting of

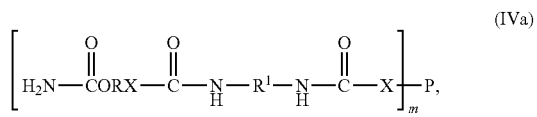
(IVa)

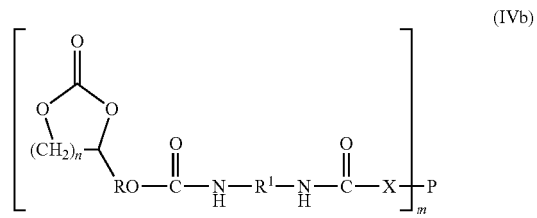
(IVb)

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups are linear, branched, or cyclic; X is O or $NR^2$, wherein $R^2$ is H or alkyl having 1 to 6 carbon atoms; n is 1 to 4, and R is alkyl, aryl, alkylaryl, or arylalkyl having up to 12 carbon atoms and optionally including one or more heteroatoms, m is an integer that is 1 or greater when X is NH or 2 or greater when X is not NH, and P represents an m-valent core that is the residue of the reactant having at least two active hydrogen-containing groups.

8. A method according to claim 7, wherein the oligomer has the structure (IVb) and is further reacted with ammonia.

9. A method of making an oligomer, comprising:
(a) reacting one mole of a uretdione compound (I)

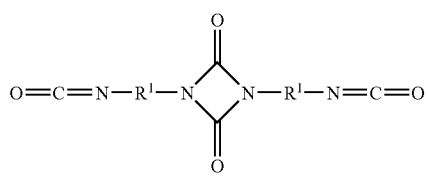

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups are linear, branched, or cyclic;
  with two moles of compound (II) selected from compounds having one group having an active hydrogen reactive with isocyanate and further having a cyclic carbonate group to form a compound comprising a structure

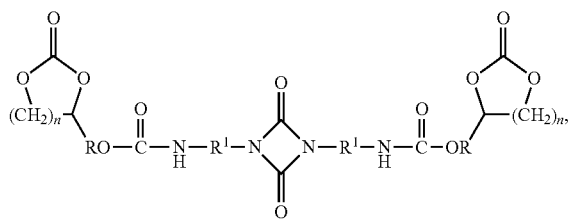

wherein n is 1 to 4 and R is alkyl, aryl, alkylaryl, or arylalkyl having up to 12 carbon atoms and optionally including one or more heteroatoms,
that is then further reacted with ammonia to produce a compound comprising a structure (IIId):

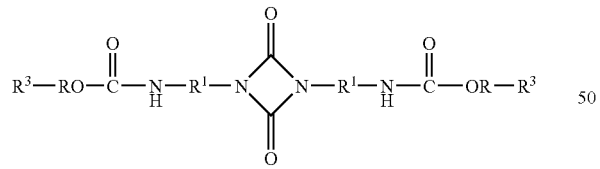

wherein R and $R^1$ are as previously defined, and each $R^3$ independently has a structure

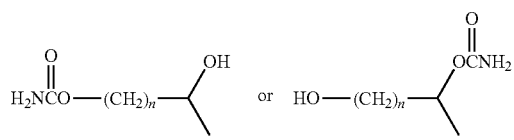

wherein n is as previously defined and
(b) reacting the compound comprising the structure (IIId) with a reactant having at least two active hydrogen-containing groups selected from the group consisting of polyols, polyamines having at least two amine groups selected from primary and secondary amine groups, and aminoalcohols having at least one amine group that is a primary or secondary amine group under reaction conditions that cause the uretdione ring to cleave and react with the active hydrogens to form the oligomer.

10. A method according to claim 9, wherein the oligomer has a structure comprising repeating monomer units of structures selected from the group consisting of

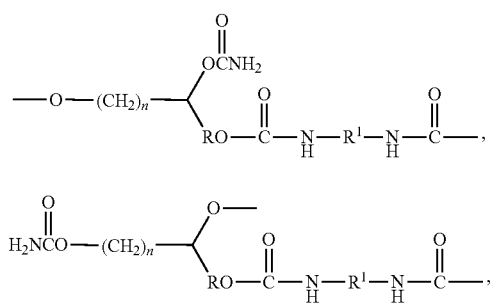

and combinations thereof, wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups are linear, branched, or cyclic; and R is alkyl, aryl, alkylaryl, or arylalkyl having up to 12 carbon atoms and optionally including one or more heteroatoms.

11. A method of making an oligomer, comprising:
(a) reacting one mole of a uretdione compound (I)

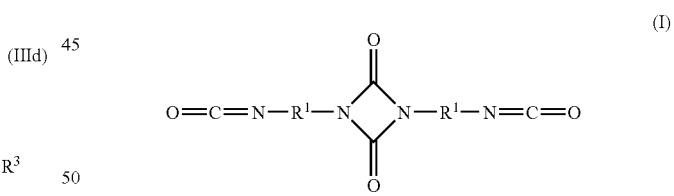

wherein each $R^1$ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups are linear, branched, or cyclic;
  with two moles of compound (II) selected from compounds having one group having an active hydrogen reactive with isocyanate and further having a cyclic carbonate group and compounds having one group having an active hydrogen reactive with isocyanate and further having a primary carbamate group to form a compound comprising a structure

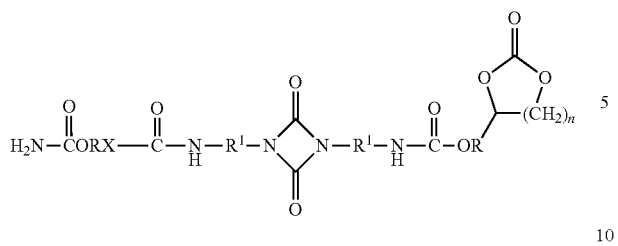

wherein n is 1 to 4 and R is alkyl, aryl, alkylaryl, or arylalkyl having up to 12 carbon atoms and optionally including one or more heteroatoms, that is further reacted with ammonia to produce a compound comprising a structure (IIIe):

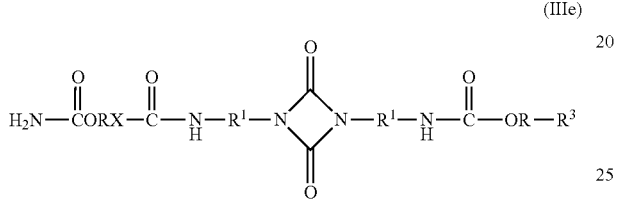

(IIIe)

wherein X is O or NR², wherein R² is H or alkyl having 1 to 6 carbon atoms, R and R¹ are as previously defined, and each R³ independently has a structure

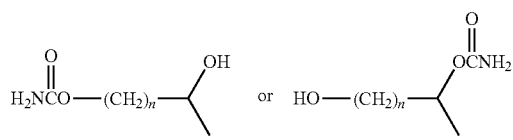

wherein n is as previously defined and (b) reacting the compound comprising the structure (IIIe) with a reactant having at least two active hydrogen-containing groups selected from the group consisting of polyols, polyamines having at least two amine groups selected from primary and secondary amine groups, and aminoalcohols having at least one amine group that is a primary or secondary amine group under reaction conditions that cause the uretdione ring to cleave and react with the active hydrogens to form the oligomer.

12. A method according to claim 11, wherein the oligomer has a structure selected from the group consisting of

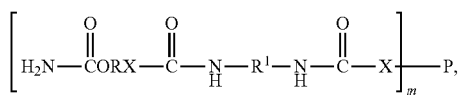

structures with repeating monomer units of structures:

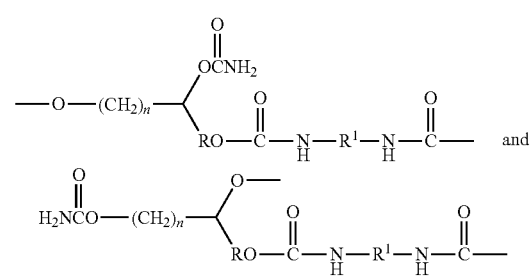

and and combinations thereof, wherein m is an integer that is 1 or greater when X is NH or 2 or greater when X is not NH, and P represents an m-valent core that is the residue of the reactant having at least two active hydrogen-containing groups.

13. A method of making an oligomer, comprising:
(a) reacting one mole of a uretdione compound (I)

(I)

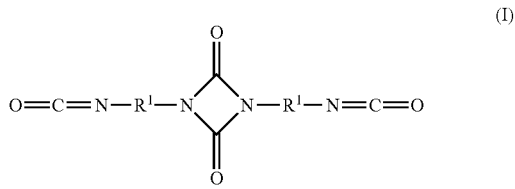

wherein each R¹ is independently selected from alkylene groups having 1 to 12 carbon atoms, arylene groups having 5 to 12 carbon atoms, and arylalkylene and alkylarylene groups having 6 to 15 carbon atoms, wherein alkylene groups, alkylene portions of arylakylene groups, and alkyl portions of alkylarylene groups are linear, branched, or cyclic;

with two moles of compound (II) having one group having an active hydrogen reactive with isocyanate and further having a cyclic carbonate group to form a compound (III), (b) reacting compound (III) with ammonia to produce a product having groups selected from the group consisting of

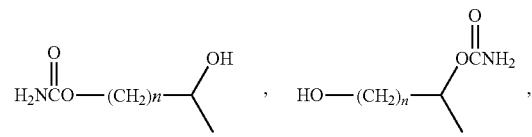

and combinations thereof, wherein n is 1 to 4;
(c) self-condensing the product under uretdione ring-opening reaction condition to make the oligomer.

* * * * *